(12) United States Patent
Chen et al.

(10) Patent No.: US 11,360,325 B2
(45) Date of Patent: Jun. 14, 2022

(54) EMPLOYING DIFFRACTIVE STRUCTURE TO REDUCE SOFT CONTACT LENS VARIATION

(71) Applicant: Johnson & Johnson Vision Care, Inc., Jacksonville, FL (US)

(72) Inventors: Minghan Chen, St. Johns, FL (US); C. Benjamin Wooley, Jacksonville, FL (US)

(73) Assignee: Johnson & Johnson Vision Care, Inc, Jacksonville, FL (US)

( * ) Notice: Subject to any disclaimer, the term of this patent is extended or adjusted under 35 U.S.C. 154(b) by 161 days.

(21) Appl. No.: 16/272,019

(22) Filed: Feb. 11, 2019

(65) Prior Publication Data
US 2020/0257137 A1 Aug. 13, 2020

(51) Int. Cl.
*G02C 7/02* (2006.01)
*G02C 7/04* (2006.01)

(52) U.S. Cl.
CPC ............ *G02C 7/041* (2013.01); *G02C 7/022* (2013.01); *G02C 7/044* (2013.01); *G02C 2202/08* (2013.01); *G02C 2202/20* (2013.01)

(58) Field of Classification Search
CPC .... G02C 2202/20; G02C 7/022; G02C 7/024; G02C 7/04; G02C 7/041; G02C 7/044; G02C 7/049; G02C 7/06; G02C 7/068; G02C 7/083; G02C 2202/08
USPC ............ 351/159.11, 159.15, 159.35, 159.44
See application file for complete search history.

(56) References Cited

U.S. PATENT DOCUMENTS

| | | | |
|---|---|---|---|
| 5,104,212 A * | 4/1992 | Taboury | G02B 5/1876 264/1.7 |
| 5,152,788 A * | 10/1992 | Isaacson | A61F 2/1613 623/6.13 |
| 5,349,394 A * | 9/1994 | Freeman | G02B 5/1876 351/159.02 |
| 7,073,906 B1 * | 7/2006 | Portney | G02C 7/042 351/159.44 |
| 2004/0246440 A1 | 12/2004 | Andino et al. | |
| 2006/0116764 A1 * | 6/2006 | Simpson | A61F 2/164 351/159.11 |
| 2009/0240328 A1 * | 9/2009 | Treushnikov | A61F 2/1618 623/6.3 |
| 2010/0066973 A1 * | 3/2010 | Portney | G02C 7/028 351/159.05 |
| 2010/0097569 A1 | 4/2010 | Weeber et al. | |
| 2010/0100178 A1 * | 4/2010 | Weeber | A61F 2/1618 623/6.28 |
| 2010/0131060 A1 * | 5/2010 | Simpson | A61F 2/1654 623/6.24 |
| 2011/0109874 A1 | 5/2011 | Piers et al. | |
| 2013/0201442 A1 | 8/2013 | Back | |
| 2015/0301356 A1 * | 10/2015 | Tabirian | G02B 6/3534 623/6.31 |
| 2016/0313572 A1 * | 10/2016 | Haddock | G02B 5/1895 |
| 2016/0334640 A1 | 11/2016 | de Juan, Jr. et al. | |

(Continued)

*Primary Examiner* — Jordan M Schwartz

(57) ABSTRACT

An ophthalmic lens may comprise a main body comprising an optic zone and a peripheral zone disposed adjacent the optic zone, wherein the optic zone comprises a refractive structure that exhibits a first optical power and a diffractive structure disposed within the optic zone, wherein the diffractive structure exhibits a second optical power, wherein the ophthalmic lens is associated with a first target SKU optical power.

8 Claims, 14 Drawing Sheets

(56) References Cited

U.S. PATENT DOCUMENTS

2017/0156849 A1  6/2017 Weeber
2017/0245986 A1  8/2017 Canovas Vidal et al.
2019/0004221 A1* 1/2019 Weeber .................... G02C 7/06

* cited by examiner

| SKU (D) | Refractive Power(D) | Diffractive Power(D) |
|---|---|---|
| -9 | -3 | -6 |
| -8 | -3 | -5 |
| -7 | -3 | -4 |
| -6 | -3 | -3 |
| -5 | -3 | -2 |
| -4 | -3 | -1 |
| -3 | -3 | 0 |
| -2 | -3 | 1 |
| -1 | -3 | 2 |
| 0 | -3 | 3 |
| 1 | -3 | 4 |
| 2 | -3 | 5 |
| 3 | -3 | 6 |
| 4 | -3 | 7 |

FIG. 4B

EMPLOYING DIFFRACTIVE STRUCTURE TO REDUCE SOFT CONTACT LENS VARIATION

BACKGROUND OF THE DISCLOSURE

1. Field of the Disclosure

The present disclosure relates to ophthalmic devices, such as wearable lenses, including contact lenses, scleral lens, RGP lens, implantable lenses, including inlays and onlays and any other type of device comprising optical components, and more particularly, to ophthalmic devices having diffractive structure.

2. Discussion of the Related Art

A typical soft contact lens surface includes several circular and/or annular zones. The center part of the lens is its optic zone, which offers patient ocular visual corrections. Beyond the optic zone is a junction zone, which actually is a quick (or sharp) thickness variation region connecting the optic zone area to lens peripheral area. Lens peripheral area is mainly designed to provide optimized lens stability and comfort.

Within the optic zone, in order to achieve the designed lens power, a thickness variation is required. Within optic zone, rays were refracted with different angles across the optic zone region and thus visual correction can be achieved. However, for certain lenses (e.g., stock keeping units (SKU) having a designed target optical power for positive and/or negative correction power), the thickness variation across the optic zone area introduces either very thick edge thickness (for larger negative SKU lens) or very thin edge thickness (for large positive SKU lens). Beyond optic zone, a junction region is required to connect the lens optic zone edge with lens peripheral area. With very thin or very thick optic zone edge thickness, a sharp junction is required. The sharp junction region is not easy to be fabricated in manufacturing and not comfort for patient. Thus, minimize the thickness variation is critical to reduce the sharp junction area. With minimized lens thickness variation across the optic zone, lens refraction power was also reduced. For higher SKU lens, the reduced thickness variation cannot satisfy the requirement for optical power correction.

Improvements are needed.

SUMMARY OF THE DISCLOSURE

The present disclosure relates to ophthalmic devices such as ophthalmic lenses. An ophthalmic device may comprise diffractive patterns to the peripheral regions of the lens optic zone (OZ) area. At soft contact lens edge, optical ray power can be modified by diffraction patterns and thus a thickness variation is not critical any more.

The present disclosure relates to ophthalmic devices such as ophthalmic lenses. An ophthalmic lens may comprise a main body comprising an optic zone and a peripheral zone disposed adjacent the optic zone, wherein the optic zone comprises a refractive structure that exhibits a first optical power and a diffractive structure disposed within the optic zone, wherein the diffractive structure exhibits a second optical power, wherein the ophthalmic lens is associated with a first target SKU optical power.

An ophthalmic lens may comprise a main body comprising an optic zone and a peripheral zone disposed adjacent the optic zone, wherein the optic zone comprises a refractive structure that exhibits a first optical power; and a diffractive structure disposed within the optic zone, adjacent the optic zone, or both, wherein the diffractive structure exhibits a second optical power, wherein the ophthalmic lens is associated with a first target SKU optical power, and wherein at least the diffractive structure is configured such that a diameter of the optic zone of the ophthalmic lens and a diameter of an optic zone of a comparative lens are at least 7.0 mm, wherein the comparative lens is substantially similar to the ophthalmic lens but with the comparative lens being associated with a second target SKU optical power that is different from the first target SKU optical power.

An ophthalmic lens may comprise a main body comprising an optic zone and a peripheral zone disposed adjacent the optic zone, wherein the optic zone comprises a refractive structure that exhibits a first optical power; and a diffractive structure disposed adjacent or within the optic zone, wherein the diffractive structure exhibits a second optical power, wherein at least the diffractive structure minimizes a variation between a center thickness of the optic zone of the ophthalmic lens and a center thickness of an optic zone of a comparative lens that is substantially similar to the ophthalmic lens but with the comparative lens having a refractive structure exhibiting a third optical power that is different from the first optical power.

An ophthalmic lens may comprise a main body comprising an optic zone and a peripheral zone disposed adjacent the optic zone, wherein the optic zone comprises a refractive structure that exhibits a first optical power; and a diffractive structure disposed adjacent or within the optic zone, wherein the diffractive structure exhibits a second optical power, wherein at least the diffractive structure is configured to minimize a root-mean-square (RMS) variation between a thickness variation profile of the ophthalmic lens and a thickness variation profile of a comparative lens that is substantially similar to the ophthalmic lens but with the comparative lens having a refractive structure exhibiting a third optical power that is different from the first optical power.

An ophthalmic lens may comprise a main body comprising an optic zone and a peripheral zone disposed adjacent the optic zone, wherein the optic zone comprises a refractive structure that exhibits a first optical power; and a diffractive structure disposed adjacent or within the optic zone, wherein the diffractive structure exhibits a second optical power, wherein at least the diffractive structure minimizes a variation of an optic zone edge junction thickness of the ophthalmic lens and an optic zone edge junction thickness of a comparative lens that is substantially similar to the ophthalmic lens but with the comparative lens having a refractive structure exhibiting a third optical power that is different from the first optical power.

BRIEF DESCRIPTION OF THE DRAWINGS

The foregoing and other features and advantages of the disclosure will be apparent from the following, more particular description of preferred embodiments of the disclosure, as illustrated in the accompanying drawings.

FIG. 4B illustrates examples of refractive and diffractive power distribution across lens SKU (e.g., target SKU optical power).

DETAILED DESCRIPTION

Ophthalmic devices may include implantable device and/or wearable devices, such as contact lenses. Conventional contact lenses comprise polymeric structures with specific shapes to correct various vision problems. The ophthalmic devices may comprise an optic zone and a peripheral zone disposed adjacent the optic zone. The optic zone may function to provide one or more of vision correction, vision enhancement, other vision-related functionality, mechanical support, or even a void to permit clear vision. In accordance with the present disclosure, the optic zone may comprise a variable optic element configured to provide enhanced vision at near and distant ranges based on signals sensed from the ciliary muscle. The variable-optic element may comprise any suitable device for changing the focal length of the lens or the refractive power of the lens based upon activation signals from the sensing system described herein. For example, the variable optic element may be as simple as a piece of optical grade plastic incorporated into the lens with the ability to have its spherical curvature changed.

Figure 1A:
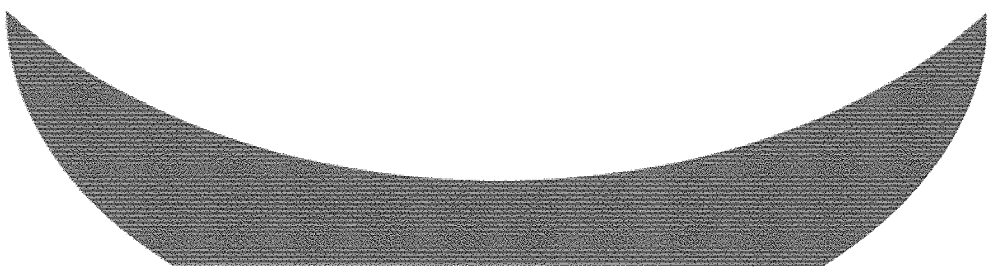
FIG. 1A illustrates an exemplary representation of a conventional lens configured for negative optical power.
Figure 1B:
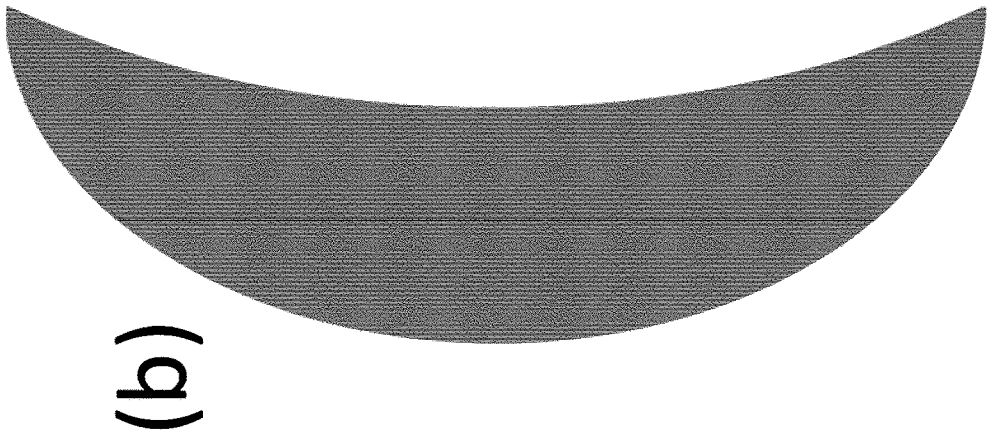
FIG. 1B illustrates an exemplary representation of a conventional lens configured for positive optical power.
Figure 9:
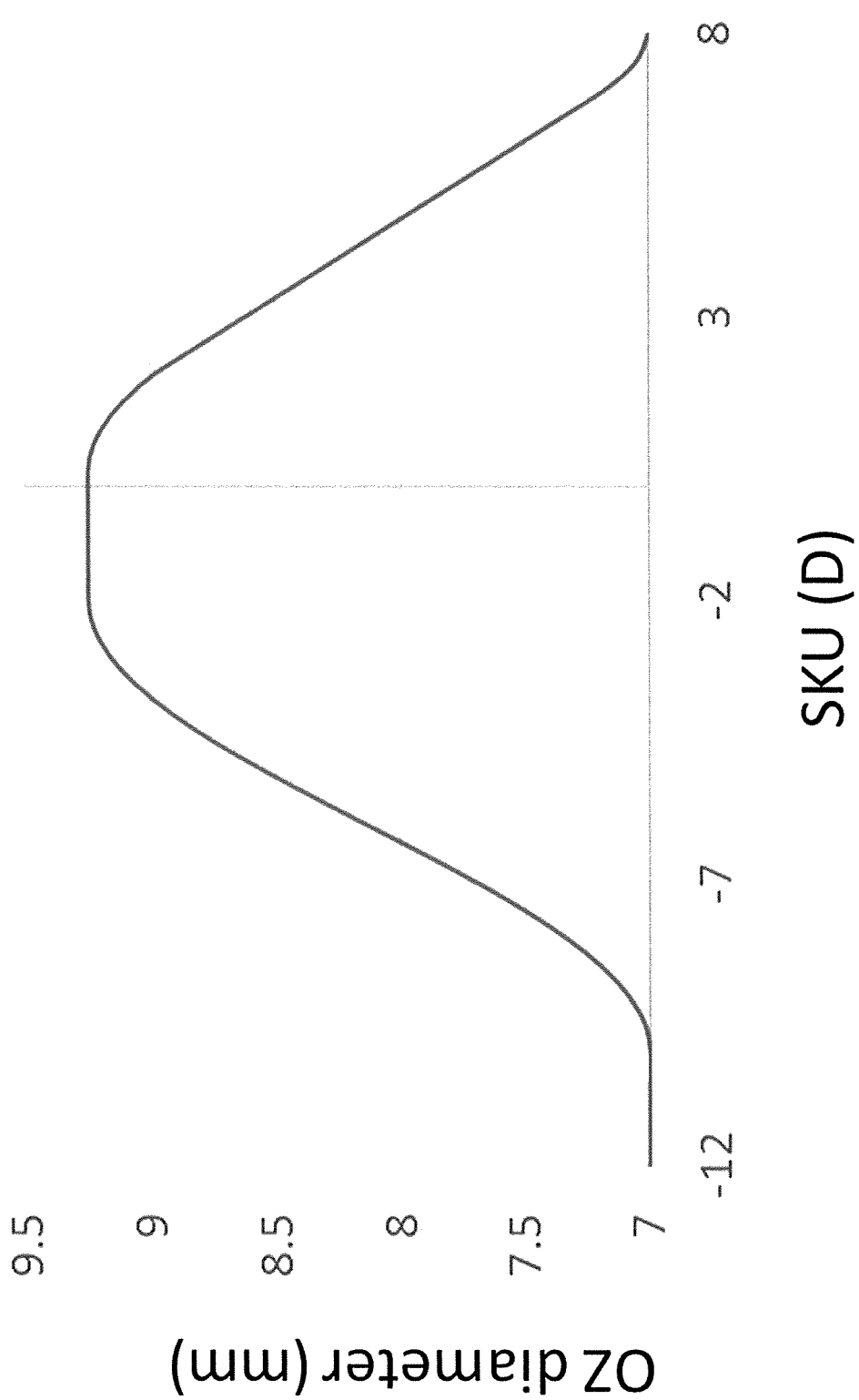
FIG. 9 illustrates non-limiting example optic zone (OZ) diameter for various lenses. Other sized OZ may be used.
Figure 10:
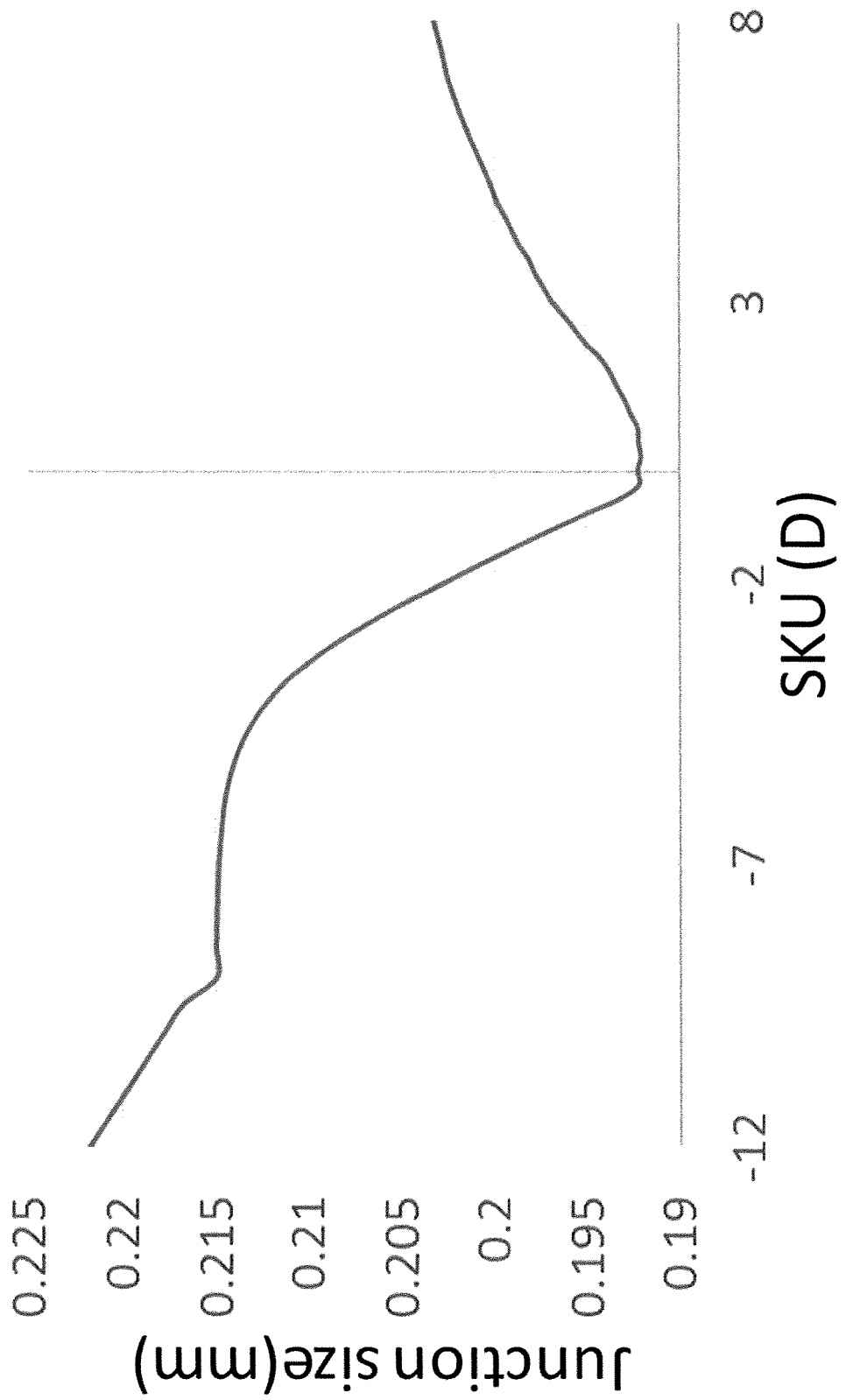
FIG. 10 illustrates non-limiting example junction zone sizes diameter for various lenses. Other sized junction zones may be used.

As a non-limiting example, soft contact lens power may be achieved through lens thickness variation across its optic zone (OZ) diameter. For a negative powered lens, lens edge thickness may be larger than that of the center. While a positive powered lens may have a thicker center thickness compared to the edge. As shown in FIGS. 1A and 1B for negative and positive respectively, with higher power (e.g., higher target SKU optical power), the larger thickness difference existed between lens center and its OZ edge. Immediately beyond the OZ edge, a mechanical junction area may be used to mitigate lens thickness from its optical edge to a thickness, which is optimized for mechanical stability and lens comfort, for example manipulating thickness of the lens in the junction area for comfort. Example OZ diameters for various lenses (SKU) having various optical powers (D) are shown for illustration in FIG. 9. Example junction sizes for various lenses (SKU) having various optical powers (D) are shown for illustration in FIG. 10. As an example, a significant lens thickness variation indicates a shaper junction region in order to transfer the thickness from OZ edge to the mechanical zone. However, precision manufacturing of the sharp optical junction is difficult, and a sharp junction zone will also significantly affect lens wearing comfort.

Figure 1C:
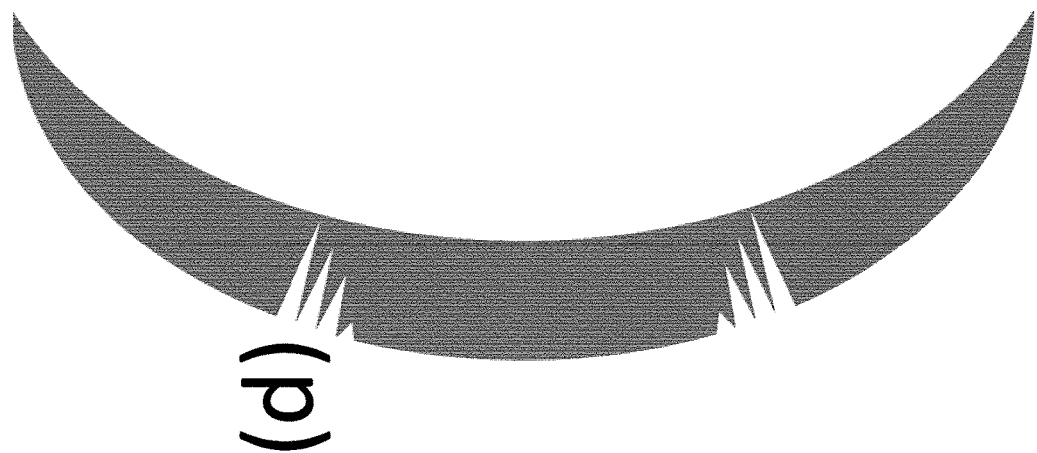
FIG. 1C illustrates an exemplary representation of a lens comprising a diffractive structure and configured for negative optical power in accordance with aspects of the present disclosure.
Figure 1D:
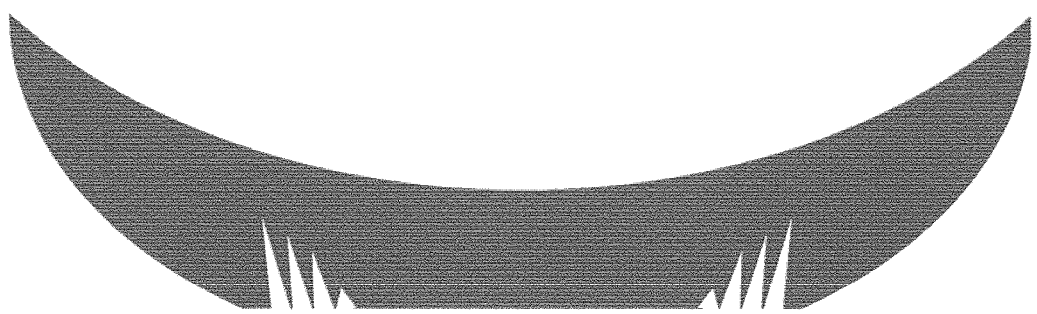
FIG. 1D illustrates an exemplary representation of a lens comprising a diffractive structure and configured for positive optical power in accordance with aspects of the present disclosure.

In the present disclosure, diffractive structure disposed at or adjacent a lens OZ edge may be used to minimize the lens thickness difference between its center and the edge of the lens OZ. Instead of fully relying on the optical refraction (which is due to thickness variation), strong optical power (e.g., stronger than −4 for minus lens or stronger than 1D for plus lens) can also be generated by diffractive structures. Thus, the lenses of the present disclosure may minimize the overall thickness variation across its OZ and may minimize the sharp junction zone. Illustrative lens designs with incorporated diffractive optics are shown in FIGS. 1C and 1D for negative and positive lens respectively. With diffractive pattern at OZ peripheral area, overall lens thickness variation may be optimized.

Figure 2A:
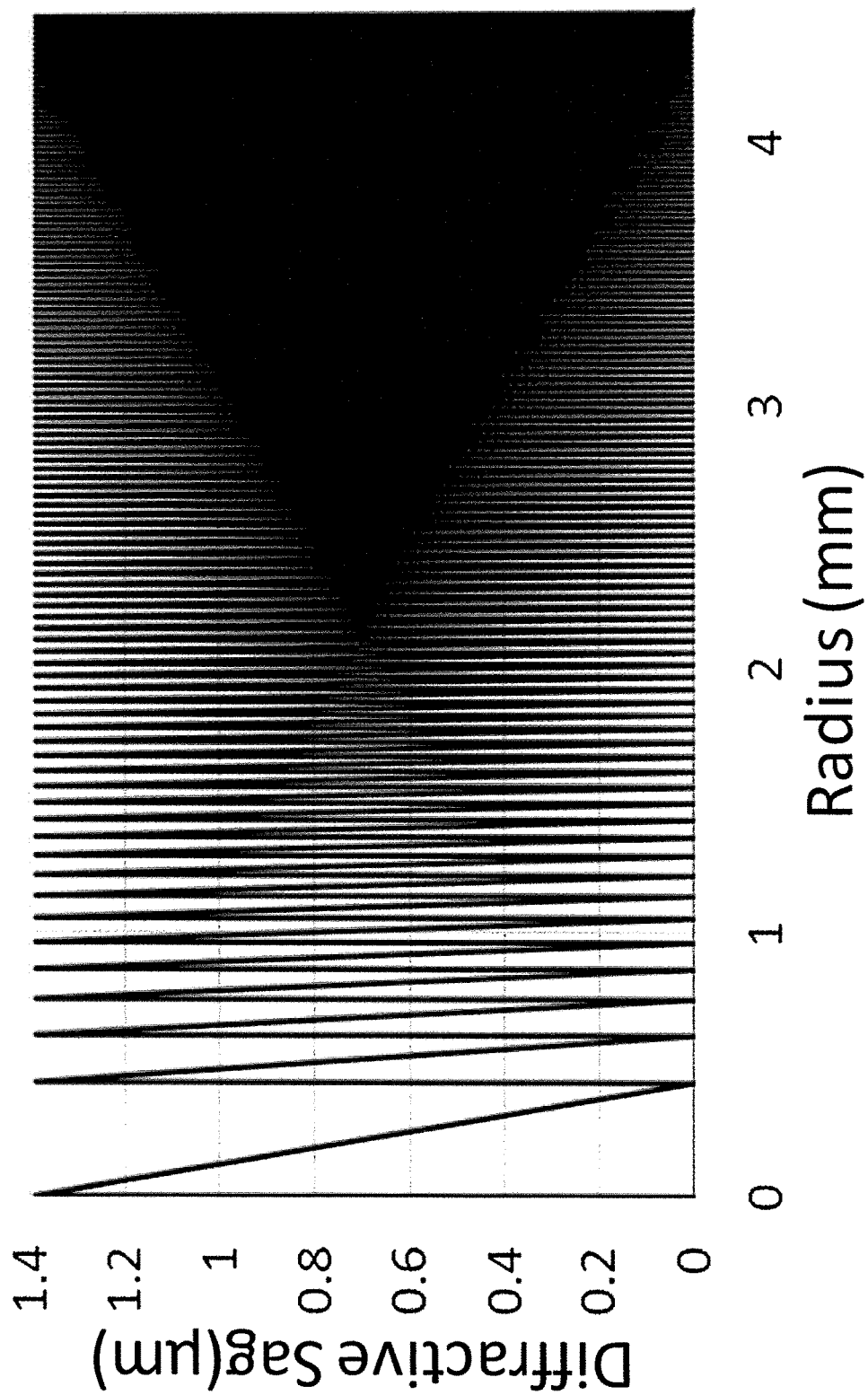
FIG. 2A illustrates an example plot of diffractive SAG vs. radius of a lens in accordance with aspects of the present disclosure.
Figure 2B:
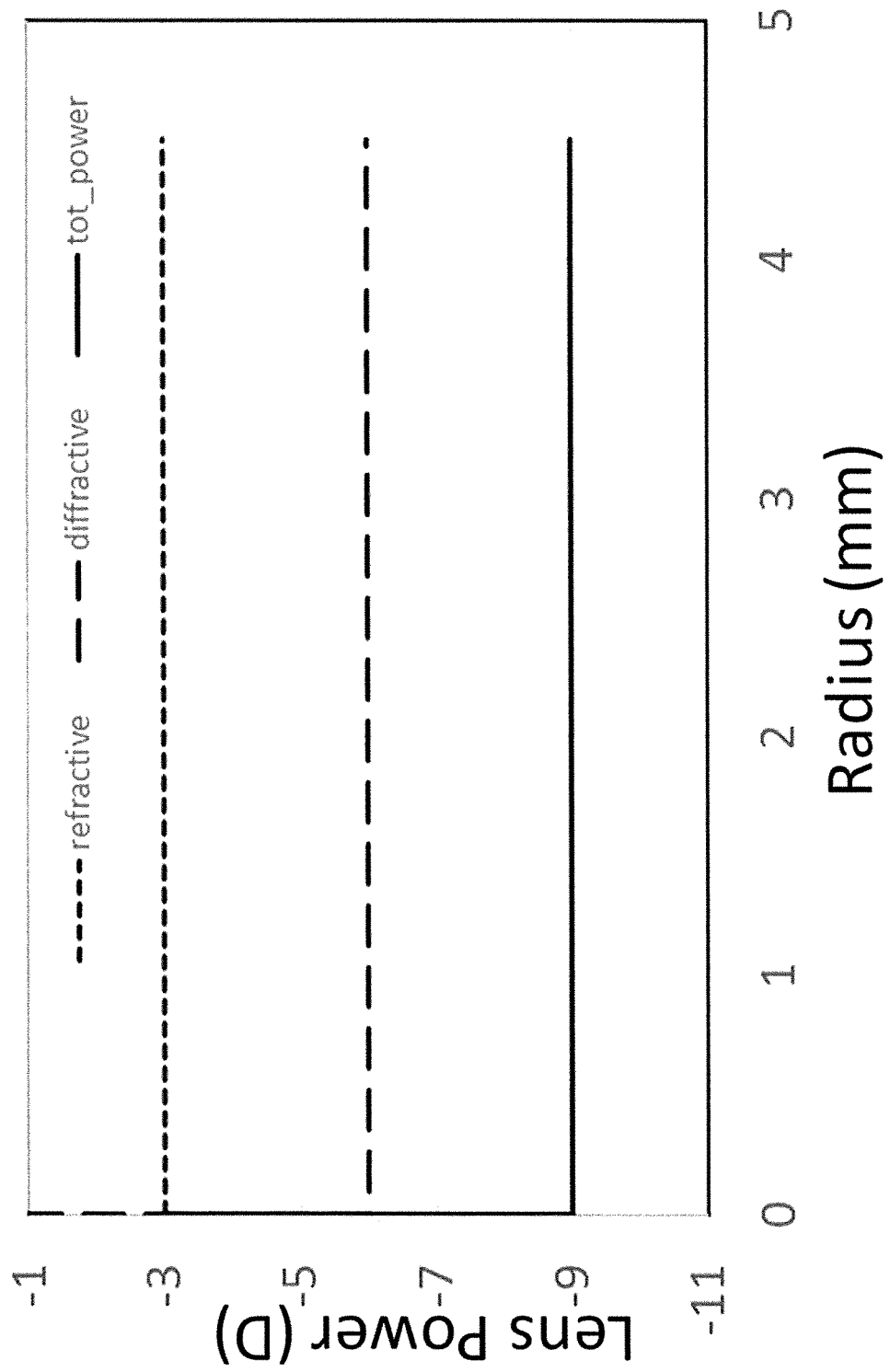
FIG. 2B illustrates an example plot of diffractive, refractive and total optical power vs. radius of a lens in accordance with aspects of the present disclosure.

FIG. 1 indicates an example of a lens with incorporated diffraction pattern at the lens edge from 2 to 6 mm radius range. As shown by the lens power in FIG. 2B, total lens power is −9D, refractive power is −3 D, and diffractive power is −6D. As shown, two-thirds of the lens power is contributed by the diffraction patterns. FIG. 2A indicates the designed surface shape of the diffraction pattern.

Figure 3A:
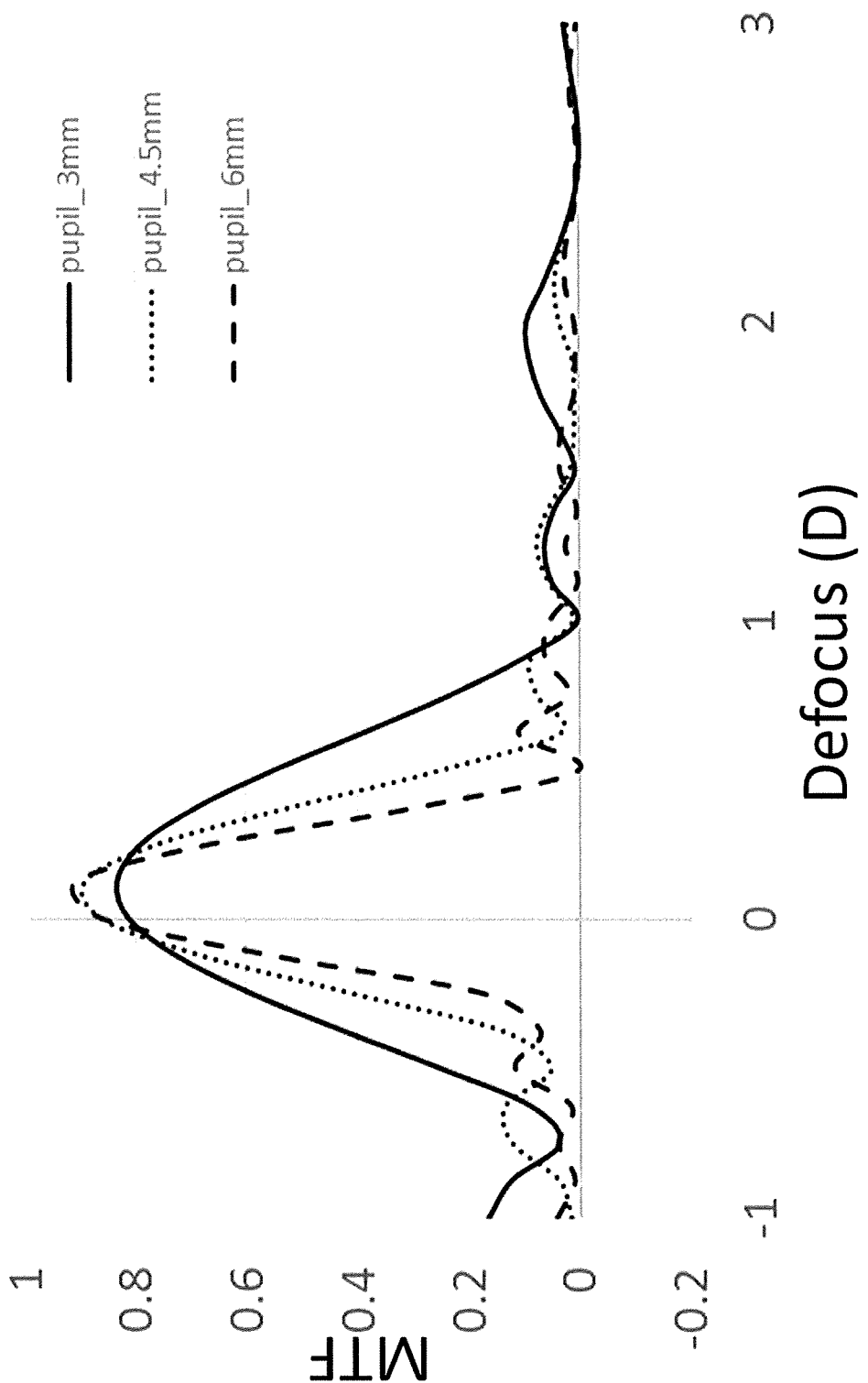
FIGS. 3A-B illustrate MTF (A) and VA (B) of the designed contact lens was also analyzed based on the optical performance modeling.
Figure 3B:
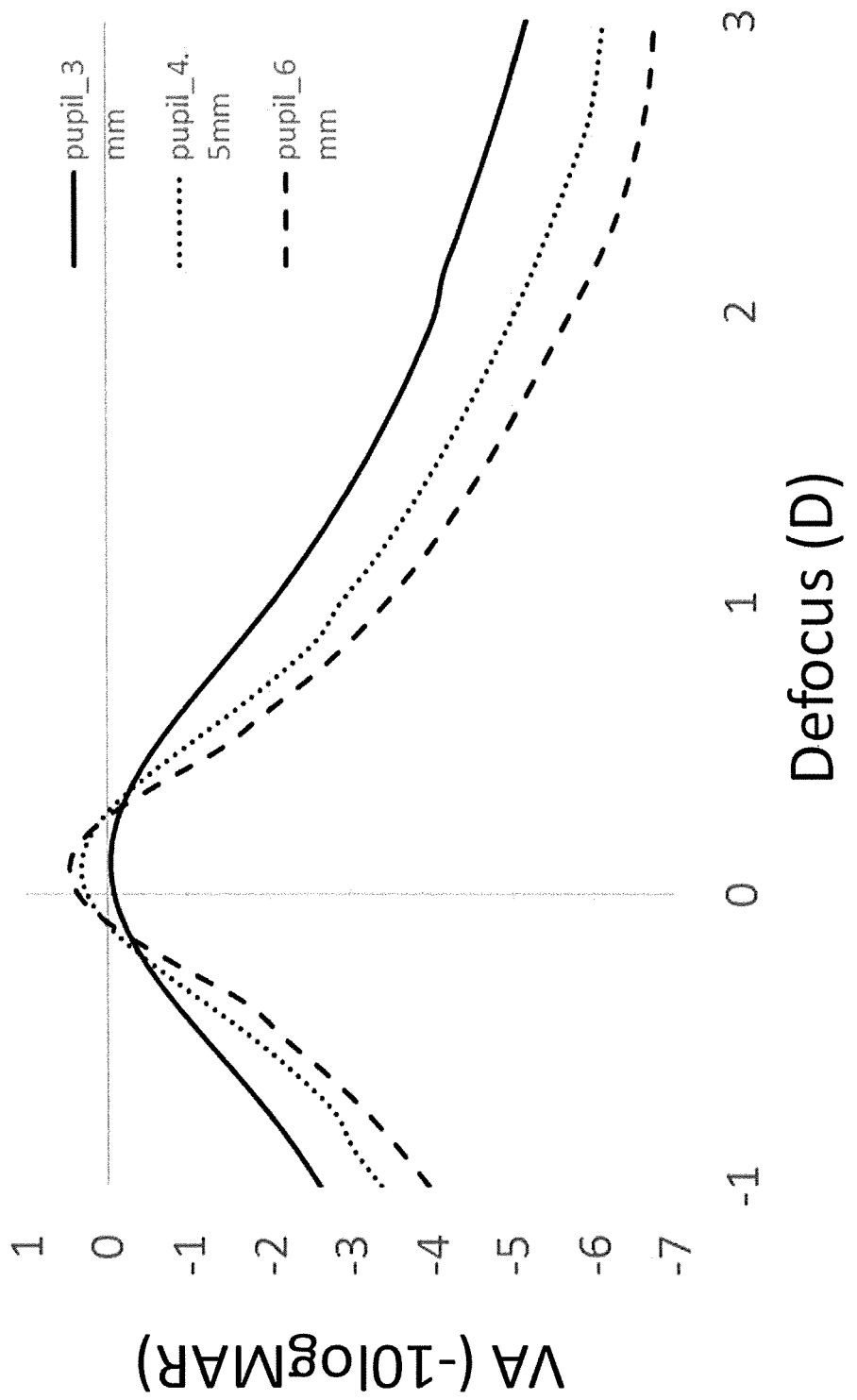

FIG. 3 indicates the optical performance of the designed lens with −3D lens power. In general, the overall theoretical diffraction efficiency is around 99%. FIGS. 3A and 3B indicates the through focus MTF and visual acuity (VA) of the designed lens with 3.0, 4.5 and 6.0 mm pupil size respectively (without patient ocular accommodation). About 20/20 vision performance was observed for patients with −3D refraction error.

Figure 4A:
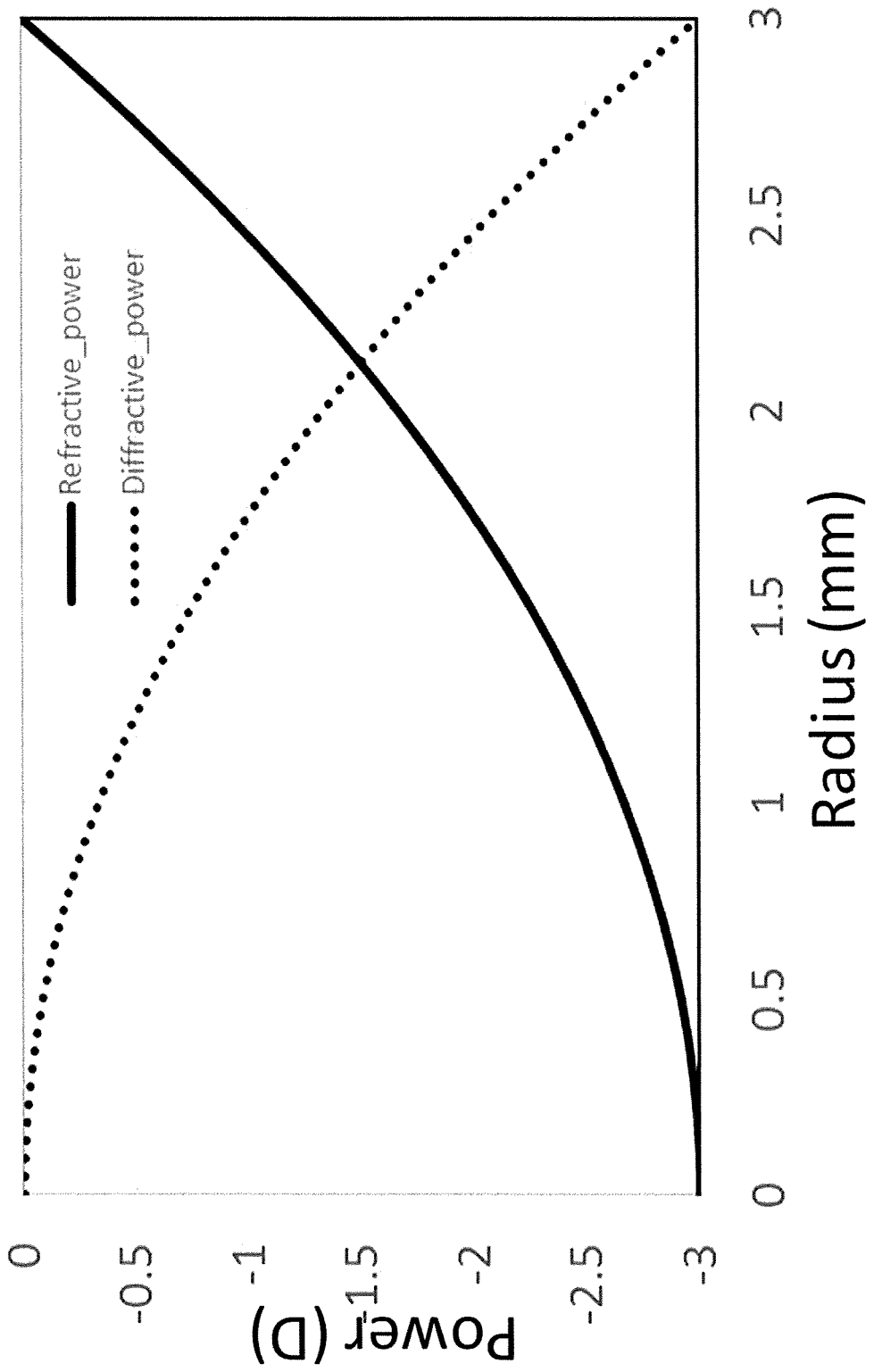
FIG. 4A illustrates non-uniform distribution of refractive and diffractive power across contact OZ area.

FIG. 4 illustrates the non-uniform distribution of refractive and diffractive power across contact OZ area. As an illustrative example, a single vision lens has a SKU/optical power of −3D. In one embodiment of the design, the diffractive power and refractive power distribution was listed in the table of FIG. 4B. As an example, within the OZ area, typically diffractive powers are not uniformly distributed across the whole OZ area. As shown in FIG. 4A, at the OZ center, refractive power dominant the total lens power while at contact lens edge diffractive power play a major role. Across the overall OZ zone, total lens power was maintained.

Figure 5:
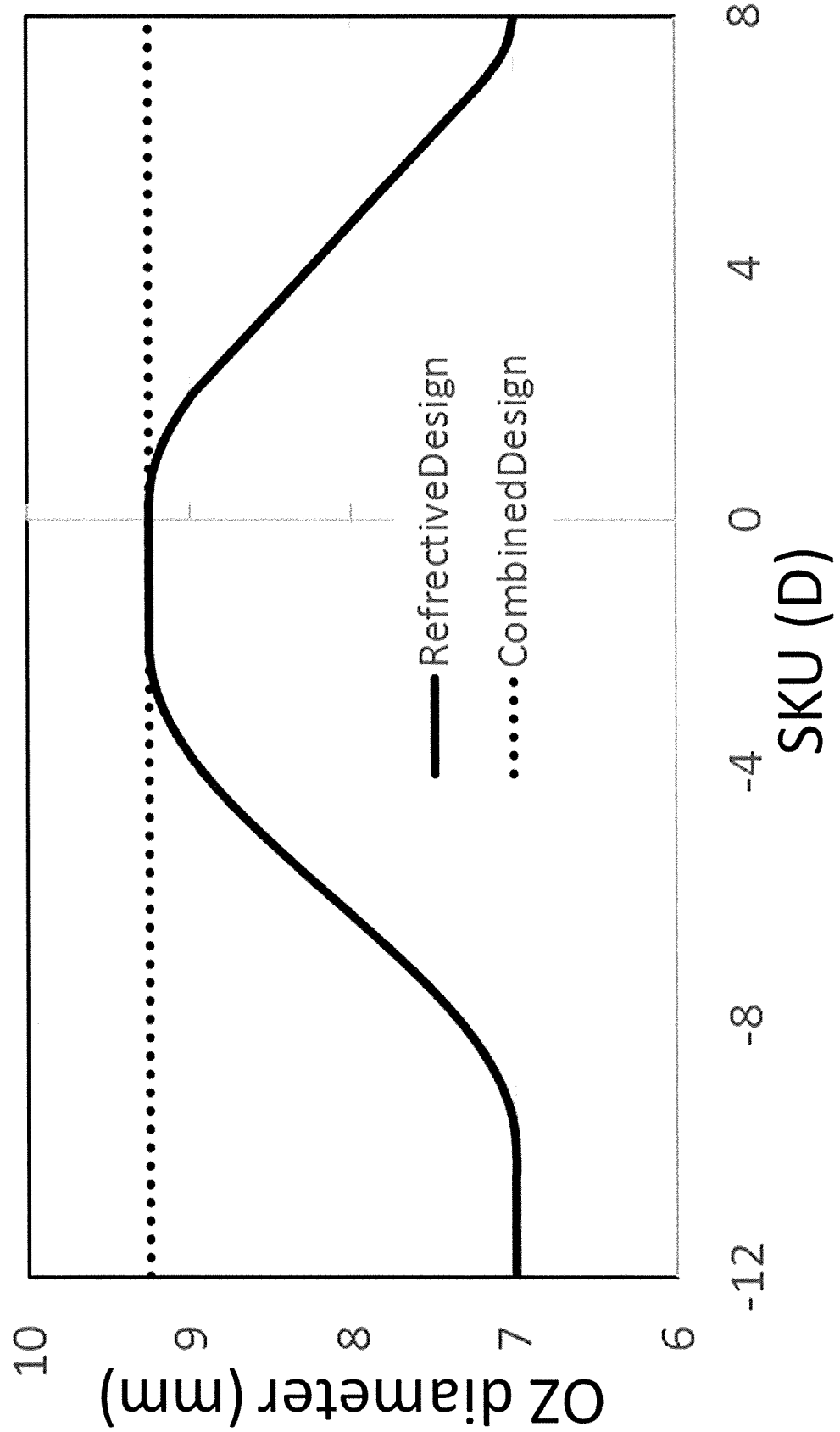
FIG. 5 illustrates a plot of OZ diameter vs. optical power, where the OZ diameter of regular refractive optical design (line) and combined diffractive and refractive lens design (dotted line).

FIG. 5 illustrates a plot of OZ diameter vs. optical power, where the OZ diameter of regular refractive optical design (line) and combined diffractive and refractive lens design (dotted line). As shown, the combined diffractive and refractive lens design of the present disclosure minimizes variations in OZ diameter across a spectrum of optical powers/SKUs.

Figure 6:
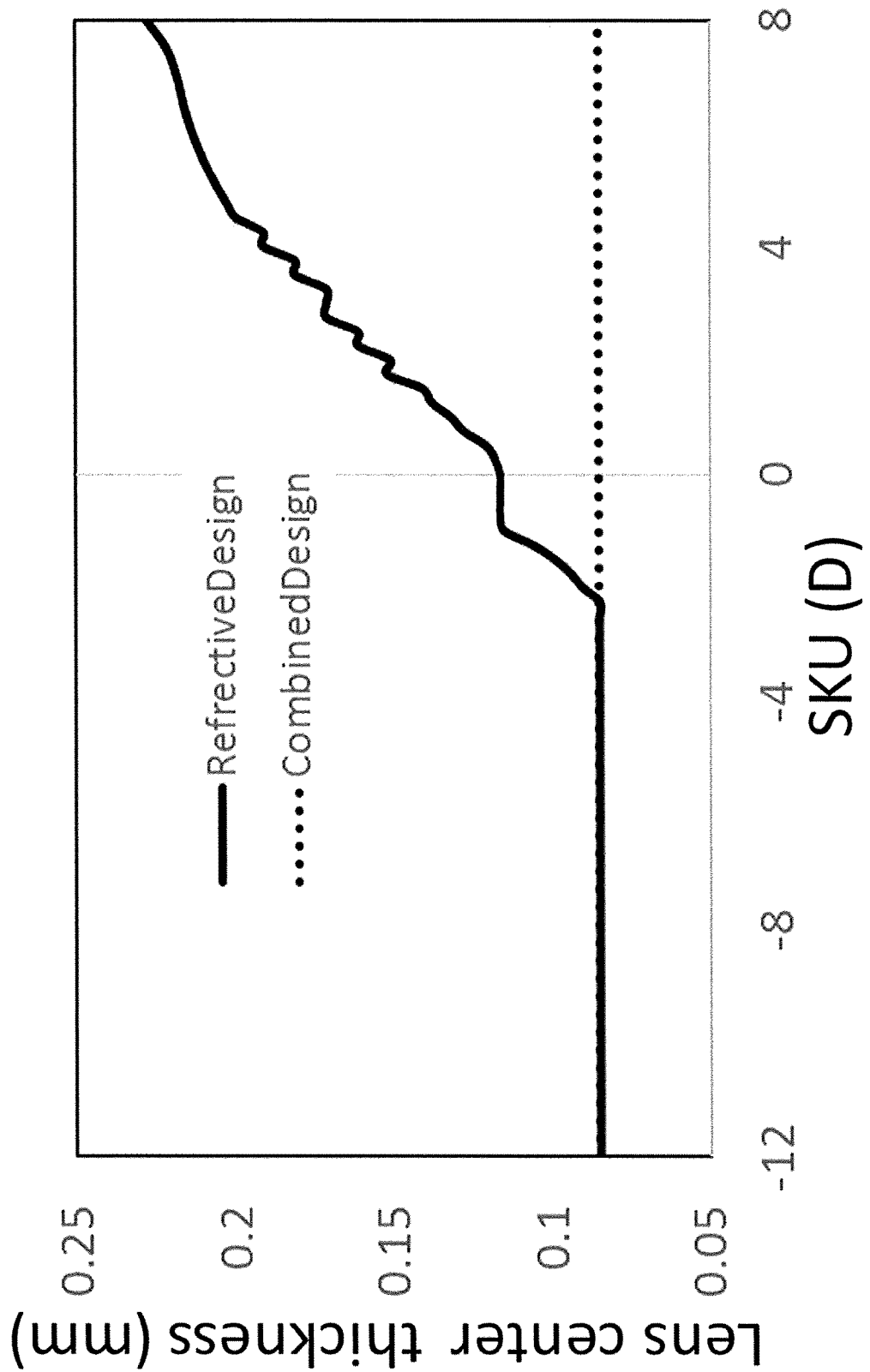
FIG. 6 illustrates center thickness vs. optical power of lenses with regular refractive optical design (line) and combined diffractive and refractive lens design (dotted line).

FIG. 6 illustrates center thickness vs. optical power of lenses with regular refractive optical design (line) and combined diffractive and refractive lens design (dotted line). As shown, the combined diffractive and refractive lens design of the present disclosure minimizes variations in center thickness across a spectrum of optical powers/SKUs.

Figure 7:
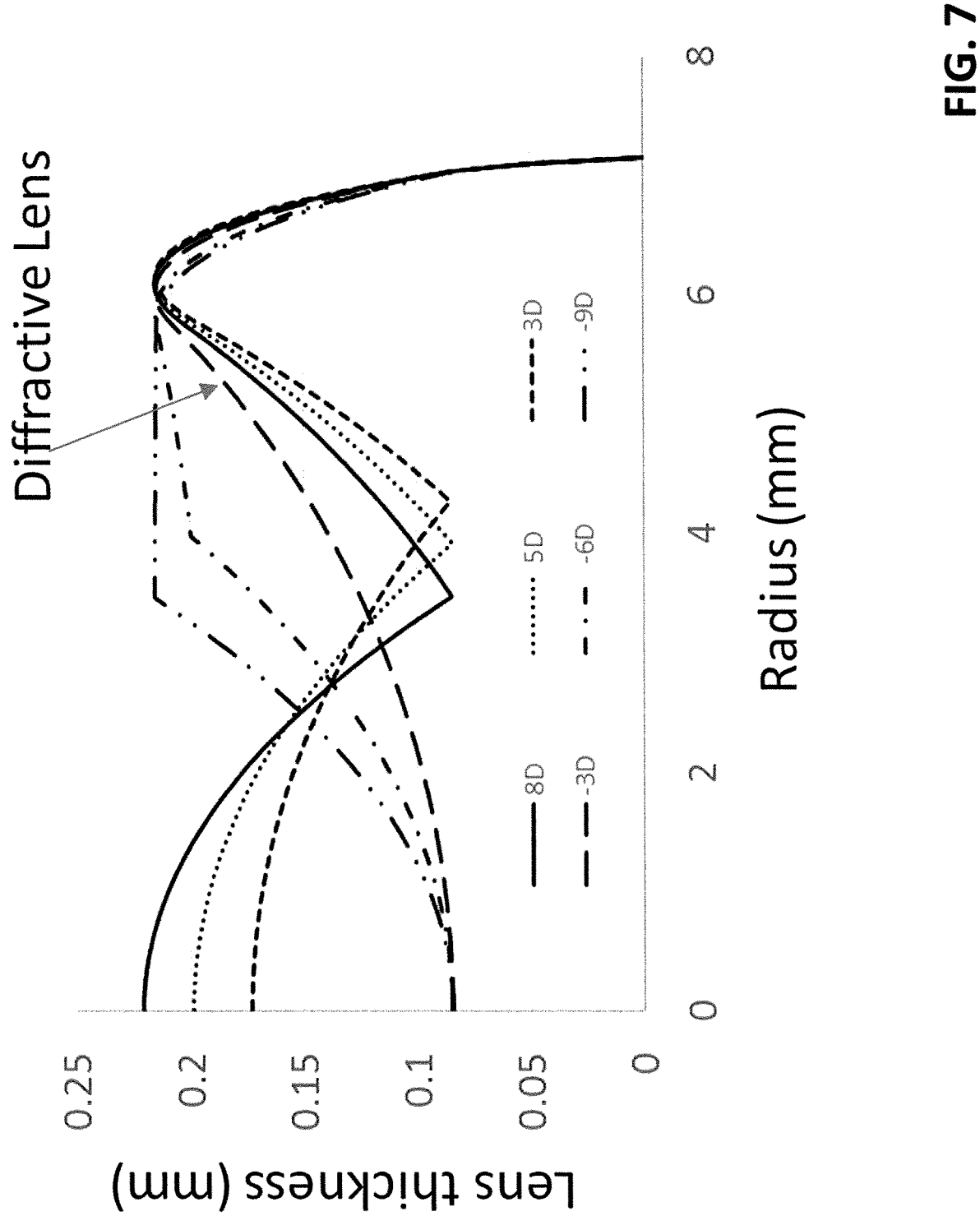
FIG. 7 illustrates spherical Lens thickness profiles. Clearly, a negative lens has thicker edge thickness than that of plus lens. As an example, with mixed diffractive and refractive design, lens thickness variation can be the same as the currently −3D lens (target SKU optical power of −3D) with only refractive power across all SKU range. As such, other target SKU optical power lenses may be provided with the same or similar lens thickness variation and therefore comfort as the current refractive power only −3D lens.
Figure 8:
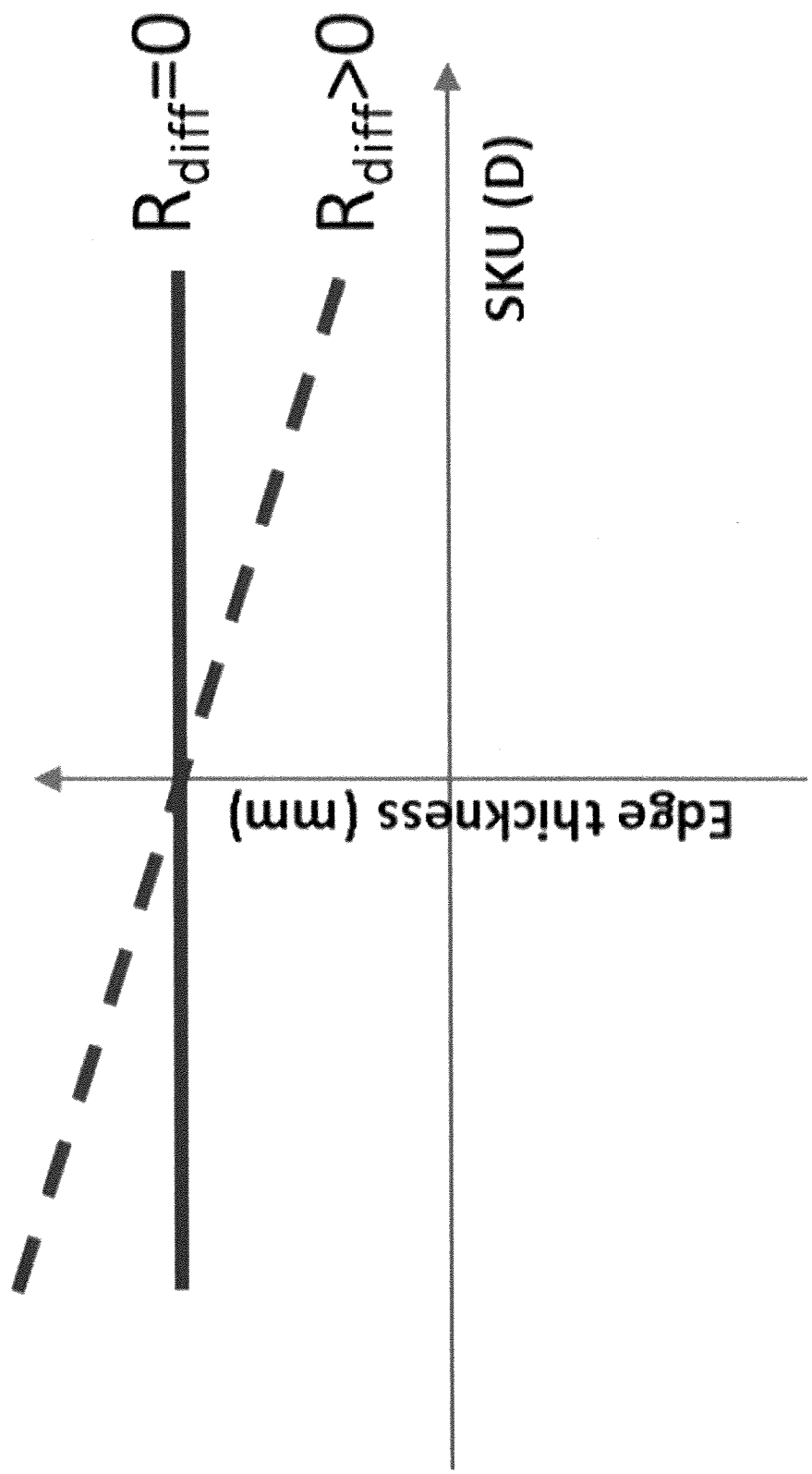
FIG. 8 illustrates a schematic diagram of lens edge thickness vs. lens power/SKUs.

Besides center thickness variation, lens optic zone edge thickness also various depending on lens power/SKU in conventional designs. FIG. 7 indicates the thickness profile of lenses with different power. The x-axis is lens radius and y-axis is thickness. Clearly, negative lenses have a thicker OZ edge thickness and plus lens has a thinner OZ edge thickness. In this design, −3D lens has the very smooth transition from optic zone to peripheral mechanical zone as shown by the arrow. With the proposed combined diffractive/refractive lens design, lens thickness variation profile can be uniform or substantially similar (or same or similar as the example −3D refractive lens which has shown to have desirable comfort) across the SKUs. In another embodiment, the diffractive power can also partially distributed across lens surface. As an example, a diffractive pattern may only cover a lens peripheral regions. If one defines the inner radius of diffraction pattern as $R_{diff}$, as shown in FIG. 8, with inner radius equals zero, the lens OZ can have a uniform lens thickness. If a diffraction pattern only partially covers the lens surface (e.g., circumferentially), lens edge thickness will vary. But the amount of variation will still be less than a lens design without any diffraction pattern.

FIG. 8 illustrates a schematic diagram of lens edge thickness vs. lens power/SKUs. When diffraction power covers the whole lens surface, edge thickness can be designed uniformly across SKUs. When diffraction pattern partially covers lens surface, there is an edge thickness variation (as shown by dashed line).

Aspects:

In various aspects, the present disclosure may pertain to one or more of the following aspects.

Aspect 1. An ophthalmic lens comprising: a main body comprising an optic zone and a peripheral zone disposed adjacent the optic zone, wherein the optic zone comprises a refractive structure that exhibits a first optical power; and a diffractive structure disposed within the optic zone, adjacent the optic zone, or both, wherein the diffractive structure exhibits a second optical power, wherein the ophthalmic lens is associated with a first target SKU optical power, and wherein at least the diffractive structure is configured such that a diameter of the optic zone of the ophthalmic lens and a diameter of an optic zone of a comparative lens are at least 7.0 mm, wherein the comparative lens is substantially similar to the ophthalmic lens but with the comparative lens being associated with a second target SKU optical power that is different from the first target SKU optical power.

Substantially similar may be defined as comprising or consisting essentially of the same base components of the subject lens. As an example, the comparative lens may comprise or consist essentially of a main body comprising an optic zone and a peripheral zone disposed adjacent the optic zone, wherein the optic zone comprises a refractive structure that exhibits a first optical power; and a diffractive structure disposed within the optic zone, wherein the diffractive structure exhibits an optical power, wherein the ophthalmic lens is associated with a target SKU optical power (that may be different from the first target SKU optical power of the subject lens).

Minimize may be defined as limiting or constraining a desired configuration to satisfy a threshold variation from another configuration which is defined by other lens properties including (but not-limited to) lens comfort, lens handing etc. As an example, with a mixed refractive/diffractive design, lens across SKUs may have an OZ that is the same as the −3D refractive only lens which, for example, may be the largest OZ in the designs across SKUs. The thickness variation profile may also be the same as the −3D refractive only lens.

Aspect 2. The ophthalmic lens according to Aspect 1, wherein the first target SKU optical power is between −10D and 10D.

Aspect 3. The ophthalmic lens according to Aspect 1, wherein the second target SKU optical power is between −10D and 10D.

Aspect 4. The ophthalmic lens according to Aspect 1, wherein the first target SKU optical power is based on the first optical power and the second optical power.

Aspect 5. The ophthalmic lens according to Aspect 1, wherein the diffractive structure is disposed adjacent a periphery of the optic zone.

Aspect 6. The ophthalmic lens according to Aspect 1, wherein the diffractive structure is disposed adjacent the peripheral zone.

Aspect 7. The ophthalmic lens according to Aspect 1, wherein the diffractive structure is disposed about a circumference of the optic zone.

Aspect 8. The ophthalmic lens according to Aspect 1, wherein the diffractive structure is circumferentially disposed around at least a portion of the optic zone.

Aspect 9. The ophthalmic lens according to Aspect 1, wherein the diffractive structure is circumferentially disposed around the optic zone at a predetermined radius from the center of the optic zone.

Aspect 10. The ophthalmic lens according to Aspect 1, wherein the diffractive structure comprises mechanical features configured to exhibit optical diffraction of incident light.

Aspect 11. The ophthalmic lens according to Aspect 1, wherein the diameter of the optic zone of the ophthalmic lens and the diameter of the optic zone of the comparative lens are between 7.0 mm and 9.5 mm.

Aspect 12. The ophthalmic lens according to Aspect 1, wherein the diameter of the optic zone of the ophthalmic lens and the diameter of the optic zone of the comparative lens are between 7.0 mm and 9.5 mm.

Aspect 13. An ophthalmic lens comprising: a main body comprising an optic zone and a peripheral zone disposed adjacent the optic zone, wherein the optic zone comprises a refractive structure that exhibits a first optical power; and a diffractive structure disposed adjacent or within the optic zone, wherein the diffractive structure exhibits a second optical power, wherein at least the diffractive structure minimizes a variation between a center thickness of the optic zone of the ophthalmic lens and a center thickness of an optic zone of a comparative lens that is substantially similar to the ophthalmic lens but with the comparative lens having a refractive structure exhibiting a third optical power that is different from the first optical power.

Substantially similar may be defined as comprising or consisting essentially of the same base components of the subject lens. As an example, the comparative lens may comprise or consist essentially of a main body comprising an optic zone and a peripheral zone disposed adjacent the optic zone, wherein the optic zone comprises a refractive structure that exhibits a first optical power; and a diffractive structure disposed adjacent or within (or both) the optic zone, wherein the diffractive structure exhibits an optical power, wherein the ophthalmic lens is associated with a target SKU optical power (that may be different from the first target SKU optical power of the subject lens).

Minimize may be defined as limiting or constraining a desired configuration to satisfy a threshold variation from another configuration which is defined by other lens properties including (but not-limited to) lens comfort, lens handing etc. As an example, with a mixed refractive/diffractive design, lens across SKUs may have a lens thickness at the center of the OZ that is within a threshold tolerance (e.g., 0.25 mm, 0.20 mm, 0.15 mm, 0.10 mm, etc.).

Aspect 14. The ophthalmic lens according to Aspect 13, wherein the variation between the center thickness of the optic zone of the ophthalmic lens and the center thickness of the optic zone of the comparative lens is less than 0.25 mm.

Aspect 15. The ophthalmic lens according to Aspect 13, wherein the variation between the center thickness of the optic zone of the ophthalmic lens and the center thickness of the optic zone of the comparative lens is less than 0.20 mm.

Aspect 16. The ophthalmic lens according to Aspect 13, wherein the variation between the center thickness of the optic zone of the ophthalmic lens and the center thickness of the optic zone of the comparative lens is less than 0.15 mm.

Aspect 17. The ophthalmic lens according to Aspect 13, wherein the variation between the center thickness of the optic zone of the ophthalmic lens and the center thickness of the optic zone of the comparative lens is less than 0.10 mm.

Aspect 18. The ophthalmic lens according to Aspect 13, wherein the first optical power is between −10D and 10D.

Aspect 19. The ophthalmic lens according to Aspect 13, wherein the second optical power is between −10D and 10D.

Aspect 20. The ophthalmic lens according to Aspect 13, wherein the diffractive structure is disposed adjacent a periphery of the optic zone.

Aspect 21. The ophthalmic lens according to Aspect 13, wherein the diffractive structure is disposed adjacent the peripheral zone.

Aspect 22. The ophthalmic lens according to Aspect 13, wherein the diffractive structure is disposed about a circumference of the optic zone.

Aspect 23. The ophthalmic lens according to Aspect 13, wherein the diffractive structure is circumferentially disposed around at least a portion of the optic zone.

Aspect 24. The ophthalmic lens according to Aspect 13, wherein the diffractive structure is circumferentially disposed around the optic zone at a predetermined radius from the center of the optic zone.

Aspect 25. The ophthalmic lens according to Aspect 13, wherein the diffractive structure comprises mechanical features configured to exhibit optical diffraction of incident light.

Aspect 26. An ophthalmic lens comprising: a main body comprising an optic zone and a peripheral zone disposed adjacent the optic zone, wherein the optic zone comprises a refractive structure that exhibits a first optical power; and a diffractive structure disposed adjacent or within the optic zone, wherein the diffractive structure exhibits a second optical power, wherein at least the diffractive structure is configured to minimize a root-mean-square (RMS) variation between a thickness variation profile of the ophthalmic lens and a thickness variation profile of a comparative lens that is substantially similar to the ophthalmic lens but with the comparative lens having a refractive structure exhibiting a third optical power that is different from the first optical power.

Substantially similar may be defined as comprising or consisting essentially of the same base components of the subject lens. As an example, the comparative lens may comprise or consist essentially of a main body comprising an optic zone and a peripheral zone disposed adjacent or within (or both) the optic zone, wherein the optic zone comprises a refractive structure that exhibits a first optical power; and a diffractive structure disposed adjacent or within (or both) the optic zone, wherein the diffractive structure exhibits an optical power, wherein the ophthalmic lens is associated with a target SKU optical power (that may be different from the first target SKU optical power of the subject lens).

Minimize may be defined as limiting or constraining a desired configuration to satisfy a threshold variation from another configuration which is defined by other lens properties including (but not-limited to) lens comfort, lens handing etc. As an example, with a mixed refractive/diffractive design, lens across SKUs may have an RMS lens thickness variation along the OZ that is within a threshold tolerance (e.g., 0.25 mm, 0.20 mm, 0.15 mm, 0.10 mm, etc).

Aspect 27. The ophthalmic lens according to Aspect 26, wherein the root-mean-square (RMS) variation between the thickness variation profile of the ophthalmic lens and the thickness variation profile of the comparative lens is less than 0.25 mm.

Aspect 28. The ophthalmic lens according to Aspect 26, wherein the root-mean-square (RMS) variation between the thickness variation profile of the ophthalmic lens and the thickness variation profile of the comparative lens is less than 0.20 mm.

Aspect 29. The ophthalmic lens according to Aspect 26, wherein the root-mean-square (RMS) variation between the thickness variation profile of the ophthalmic lens and the thickness variation profile of the comparative lens is less than 0.15 mm.

Aspect 30. The ophthalmic lens according to Aspect 26, wherein the root-mean-square (RMS) variation between the thickness variation profile of the ophthalmic lens and the thickness variation profile of the comparative lens is less than 0.10 mm.

Aspect 31. The ophthalmic lens according to Aspect 26, wherein the first optical power is between −10D and 10D.

Aspect 32. The ophthalmic lens according to Aspect 26, wherein the second optical power is between −10D and 10D.

Aspect 33. The ophthalmic lens according to Aspect 26, wherein the diffractive structure is disposed adjacent a periphery of the optic zone.

Aspect 34. The ophthalmic lens according to Aspect 26, wherein the diffractive structure is disposed adjacent the peripheral zone.

Aspect 35. The ophthalmic lens according to Aspect 26, wherein the diffractive structure is disposed about a circumference of the optic zone.

Aspect 36. The ophthalmic lens according to Aspect 26, wherein the diffractive structure is circumferentially disposed around at least a portion of the optic zone.

Aspect 37. The ophthalmic lens according to Aspect 26, wherein the diffractive structure is circumferentially disposed around the optic zone at a predetermined radius from the center of the optic zone.

Aspect 38. The ophthalmic lens according to Aspect 26, wherein the diffractive structure comprises mechanical features configured to exhibit optical diffraction of incident light.

Aspect 39. An ophthalmic lens comprising: a main body comprising an optic zone and a peripheral zone disposed adjacent the optic zone, wherein the optic zone comprises a refractive structure that exhibits a first optical power; and a diffractive structure disposed adjacent or within the optic zone, wherein the diffractive structure exhibits a second optical power, wherein at least the diffractive structure minimizes a variation of an optic zone edge junction thickness of the ophthalmic lens and an optic zone edge junction thickness of a comparative lens that is substantially similar to the ophthalmic lens but with the comparative lens having a refractive structure exhibiting a third optical power that is different from the first optical power.

Substantially similar may be defined as comprising or consisting essentially of the same base components of the subject lens. As an example, the comparative lens may comprise or consist essentially of a main body comprising an optic zone and a peripheral zone disposed adjacent the optic zone, wherein the optic zone comprises a refractive structure that exhibits a first optical power; and a diffractive structure disposed adjacent or within (or both) the optic zone, wherein the diffractive structure exhibits an optical power, wherein the ophthalmic lens is associated with a target SKU optical power (that may be different from the first target SKU optical power of the subject lens).

Minimize may be defined as limiting or constraining a desired configuration to satisfy a threshold variation from another configuration which is defined by other lens properties including (but not-limited to) lens comfort, lens handing etc. As an example, with a mixed refractive/diffractive design, lens across SKUs may have a lens thickness at the optic zone edge junction that is within a threshold tolerance (e.g., 0.035 mm, 0.030 mm, etc).

Aspect 40. The ophthalmic lens according to Aspect 39, wherein a variation of the optic zone edge junction thickness of the ophthalmic lens and the optic zone edge junction thickness of the comparative lens is less than 0.035 mm.

Aspect 41. The ophthalmic lens according to Aspect 39, wherein a variation of the optic zone edge junction thickness of the ophthalmic lens and the optic zone edge junction thickness of the comparative lens is less than 0.030 mm.

Aspect 42. The ophthalmic lens according to Aspect 39, wherein the first optical power is between −10D and 10D.

Aspect 43. The ophthalmic lens according to Aspect 39, wherein the second optical power is between −10D and 10D.

Aspect 44. The ophthalmic lens according to Aspect 39, wherein the diffractive structure is disposed adjacent a periphery of the optic zone.

Aspect 45. The ophthalmic lens according to Aspect 39, wherein the diffractive structure is disposed adjacent the peripheral zone.

Aspect 46. The ophthalmic lens according to Aspect 39, wherein the diffractive structure is disposed about a circumference of the optic zone.

Aspect 47. The ophthalmic lens according to Aspect 39, wherein the diffractive structure is circumferentially disposed around at least a portion of the optic zone.

Aspect 48. The ophthalmic lens according to Aspect 39, wherein the diffractive structure is circumferentially disposed around the optic zone at a predetermined radius from the center of the optic zone.

Aspect 49. The ophthalmic lens according to Aspect 39, wherein the diffractive structure comprises mechanical features configured to exhibit optical diffraction of incident light.

Aspect 50. A method of making the ophthalmic lens of Aspect 1.

Aspect 51. A method of making the ophthalmic lens of Aspect 13.

Aspect 52. A method of making the ophthalmic lens of Aspect 26.

Aspect 53. A method of making the ophthalmic lens of Aspect 39.

Aspect 54: An ophthalmic lens comprising: a main body comprising an optic zone and a peripheral zone disposed adjacent the optic zone, wherein the optic zone comprises a refractive structure that exhibits a first optical power; and a diffractive structure disposed adjacent and/or within the optic zone, wherein the diffractive structure exhibits a second optical power, wherein the ophthalmic lens is associated with a first target SKU optical power, and wherein at least the diffractive structure is configured to minimize a variation between one or more of: a center thickness of the optic zone of the ophthalmic lens and a center thickness of an optic zone of a comparative lens, a thickness variation profile of the ophthalmic lens and a thickness variation profile of a comparative lens, or an optic zone edge junction profile/thickness of the ophthalmic lens and an optic zone edge junction profile/thickness of a comparative lens, wherein the comparative lens is substantially similar to the ophthalmic lens but with the comparative lens being associated with a second target SKU optical power that is different from the first target SKU optical power.

Substantially similar may be defined as comprising or consisting essentially of the same base components of the subject lens. As an example, the comparative lens may comprise or consist essentially of a main body comprising an optic zone and a peripheral zone disposed adjacent the optic zone, wherein the optic zone comprises a refractive structure that exhibits a first optical power; and a diffractive structure disposed adjacent or within (or both) the optic zone, wherein the diffractive structure exhibits an optical power, wherein the ophthalmic lens is associated with a target SKU optical power (that may be different from the first target SKU optical power of the subject lens).

Minimize may be defined as limiting or constraining a desired configuration to satisfy a threshold variation from another configuration which is defined by other lens properties including (but not-limited to) lens comfort, lens handing etc. As an example, with a mixed refractive/diffractive design, lens across SKUs may have an OZ that is the same as the −3D refractive only lens which, for example, is the largest OZ in the designs across SKUs. The thickness variation profile may also be the same as the −3D refractive only lens.

Aspect 55. The ophthalmic lens according to Aspect 54, wherein the first target SKU optical power is between −10D and 10D.

Aspect 56. The ophthalmic lens according to Aspect 54, wherein the second target SKU optical power is between −10D and 10D.

Aspect 57. The ophthalmic lens according to Aspect 54, wherein the first target SKU optical power is based on the first optical power and the second optical power.

Aspect 58. The ophthalmic lens according to Aspect 54, wherein the diffractive structure is disposed adjacent a periphery of the optic zone.

Aspect 59. The ophthalmic lens according to Aspect 54, wherein the diffractive structure is disposed adjacent the peripheral zone.

Aspect 60. The ophthalmic lens according to Aspect 54, wherein the diffractive structure is disposed about a circumference of the optic zone.

Aspect 61. The ophthalmic lens according to Aspect 54, wherein the diffractive structure is circumferentially disposed around at least a portion of the optic zone.

Aspect 62. The ophthalmic lens according to Aspect 54, wherein the diffractive structure is circumferentially disposed around the optic zone at a predetermined radius from the center of the optic zone.

Aspect 63. The ophthalmic lens according to Aspect 54, wherein the diffractive structure comprises mechanical features configured to exhibit optical diffraction of incident light.

Although shown and described in what is believed to be the most practical and preferred embodiments, it is apparent that departures from specific designs and methods described and shown will suggest themselves to those skilled in the art and may be used without departing from the spirit and scope of the disclosure. The present disclosure is not restricted to the particular constructions described and illustrated but should be constructed to cohere with all modifications that may fall within the scope of the appended claims. Moreover, the recitation of the term comprising may include consisting essentially of and/or consisting of such that support is found herein for such terms by the use of the term comprising.

What is claimed is:

1. A set of soft contact lenses adapted to be placed against an eye of a wearer, comprising:

a plurality of soft contact lenses that provide a total sphere power correction ranging from a negative diopter correction to a positive diopter correction, wherein each of said contact lenses within said set further comprises a main body comprising an optic zone and a peripheral zone disposed adjacent the optic zone, wherein the optic zone comprises a refractive structure that exhibits a first optical power of −3D for all contact lenses within the set; and for lenses other than −3D total optical power, said lens further comprises a diffractive structure disposed adjacent or within the optic zone, wherein the diffractive structure exhibits a second optical power and is disposed from approximately 2 mm from a lens center to approximately 6 mm from the lens center;

wherein the first optical power and the second optical power combine to create the total sphere power correction.

2. The set according to claim 1, wherein said range is from at least −9 diopters to +4 diopters.

3. The set of lenses according to claim 1, wherein the diffractive structure is disposed at least partially within the optic zone and is not uniformly distributed across the optic zone.

4. The set of lenses according to claim 3, wherein the diffractive structure within the optic zone is constructed such that its diffractive power is distributed to increase as distance from a lens center increases.

5. The set of lenses according to claim 1, wherein a diameter of the optic zone is of a value within the range of approximately 7-9 mm.

6. The set of lenses according to claim 2, wherein the diffractive structure is disposed at least partially within the optic zone and is not uniformly distributed across the optic zone.

7. The set of lenses according to claim 6, wherein the diffractive structure within the optic zone is constructed such that its diffractive power is distributed to increase as distance form a lens center increases.

8. The set of lenses according to claim 1, wherein the contact lens has opposing first and second surfaces, and wherein the refractive and diffractive structures are both disposed on the same one of the first and second surfaces.

* * * * *